(12) United States Patent
Kaltenborn et al.

(10) Patent No.: US 6,720,858 B2
(45) Date of Patent: Apr. 13, 2004

(54) FUSE

(75) Inventors: Uwe Kaltenborn, Baden-Dättwil (CH); Lutz Niemeyer, Birr (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 10/156,838

(22) Filed: May 30, 2002

(65) Prior Publication Data

US 2002/0190838 A1 Dec. 19, 2002

(30) Foreign Application Priority Data

Jun. 1, 2001 (EP) ............................................. 01810535

(51) Int. Cl.$^7$ ......................... H01H 85/42; H01H 85/38
(52) U.S. Cl. ......................... 337/279; 337/281; 337/282
(58) Field of Search ................................. 337/273, 276, 337/279, 280, 281, 282

(56) References Cited

U.S. PATENT DOCUMENTS

| | | | |
|---|---|---|---|
| 1,950,199 A | | 3/1934 | Tritle |
| 2,343,422 A | * | 3/1944 | Rawlins ....................... 337/275 |
| 3,958,206 A | * | 5/1976 | Klint ............................ 337/406 |
| 4,220,942 A | * | 9/1980 | Meister et al. ............... 337/277 |
| 4,319,212 A | | 3/1982 | Leach |
| 4,323,873 A | | 4/1982 | Nounen et al. |
| 4,358,747 A | * | 11/1982 | Zlupko et al. ............... 337/273 |
| 4,486,734 A | * | 12/1984 | Leach .......................... 337/162 |
| 4,489,301 A | * | 12/1984 | Johnson et al. ............. 337/401 |
| 4,638,283 A | | 1/1987 | Frind et al. |
| 5,406,245 A | * | 4/1995 | Smith et al. ................. 337/273 |
| 5,621,197 A | * | 4/1997 | Bender et al. ............ 200/61.08 |
| 6,194,988 B1 | * | 2/2001 | Yamaguchi et al. ........ 337/157 |

FOREIGN PATENT DOCUMENTS

| | | |
|---|---|---|
| CH | 242936 | 11/1946 |
| DE | 954716 | 12/1956 |
| DE | 3537314 A1 | 4/1987 |
| EP | 0347173 | 12/1989 |
| FR | 1093984 | 5/1955 |
| GB | 607768 | 9/1948 |

* cited by examiner

Primary Examiner—Anatoly Vortman
(74) Attorney, Agent, or Firm—Burns, Doane, Swecker & Mathis, L.L.P.

(57) ABSTRACT

In a fuse chamber (8) there is arranged as a quenching gas source a burn-off element (11), which concentrically surrounds an arc chamber (10) and is separated from it by a fuse element (9), which consists of metal foil, preferably silver foil, and the outer side of which is adjoined by the burn-off element (11). The latter consists of an igniting material (12), arranged in the form of a ring running around centrally, and a gas-evolving material (13). Both materials consist, for example, of guanidine or guanidine derivatives as the combustible material and an oxidant, the proportion of which in the igniting material (12) is hyperstoichiometric. The arc chamber (10) is bounded at opposite ends by nozzles (7a,b), which connect it to exhaust volumes (4a,b). When there is an overcurrent, the fuse element (9) heats up to the igniting temperature of the igniting material (12) and is torn open centrally. The arc forming is axially blown by the quenching gas, which forms during the burning-off of the burn-off element (11), and quenched. The fuse element (9) may centrally have a triggering zone, where it is more easily interruptible, in particular meltable. The quenching gas source may also comprise compressed-gas tanks or cold-gas generators.

25 Claims, 6 Drawing Sheets

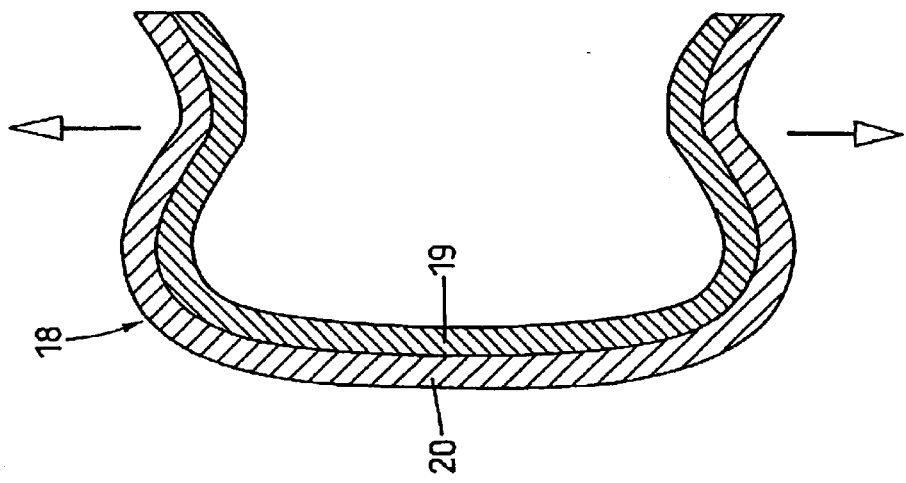
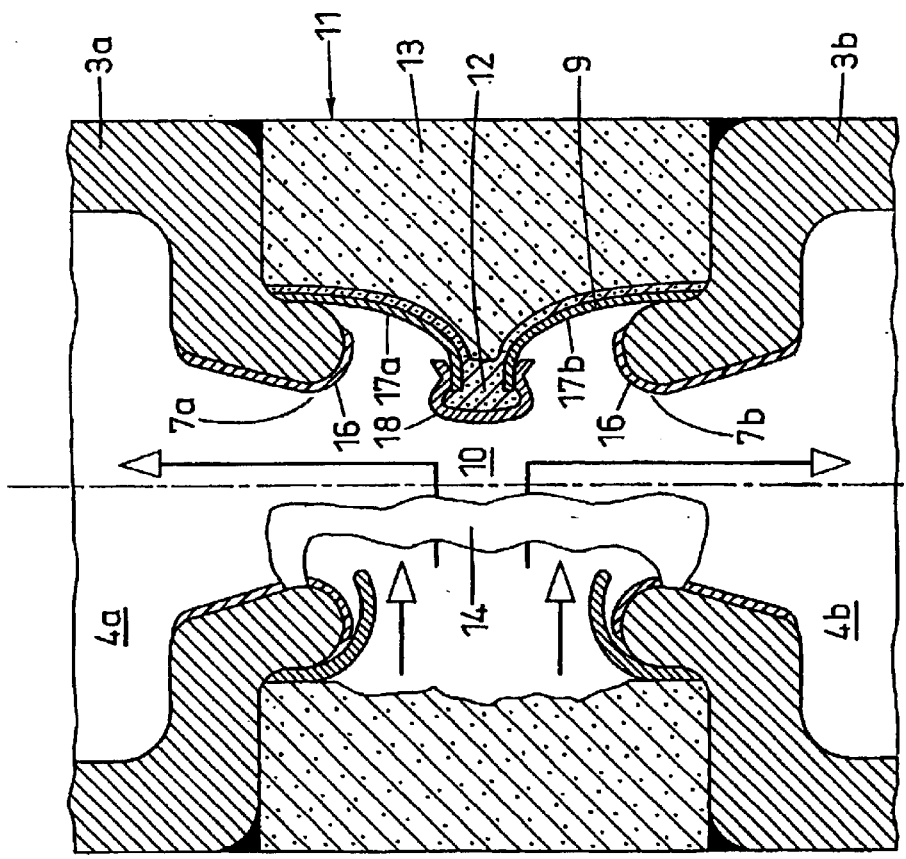

FUSE

FIELD OF THE INVENTION

The invention relates to a fuse, as used in medium- and high-voltage installations.

BACKGROUND OF THE INVENTION

Fuses of the generic type are known for example from U.S. Pat. Nos. 4,319,212 and 4,638,283. There, a fuse element in strip form, connecting the electrical terminals arranged at the opposite ends of a cylindrical fuse chamber—there may also be a number of fuse elements disposed in parallel—is wound helically onto a carrier consisting of electrically insulating material and provided with ribs. At locations at which a fuse element rests on one of the ribs there is arranged in a depression of the latter a burn-off element which burns, evolving quenching gas, as soon as an arc is formed, or the burn-off element is ignited by an electric signal.

Although fuses of this type are suitable for building up relatively high voltages, a rapid and reliable interruption of high currents is not possible since the blowing of the arc is only weak and not very effective.

SUMMARY OF THE INVENTION

A fuse according to an embodiment of the invention allows the rapid and reliable interruption of short-circuit currents of high power. The fuse has a fuse chamber with a first electrical terminal and a second electrical terminal at opposite ends of the fuse chamber. At least one fuse element of electrically conducting meltable material connects the first electrical terminal to the second electrical terminal through the fuse chamber. A triggerable quenching gas source produces a quenching gas flow in the fuse chamber. The invention provides a fuse in which not only is the fuse element interrupted but the arc thereby produced is also blown effectively enough for it to be rapidly quenched.

The fuse according to the invention can therefore also be used in high-voltage installations with nominal voltages of 72 kV and more, at nominal currents of over 2 kA. Its short-circuit disconnection capability is of the same order of magnitude as that of high-voltage switches. It can therefore be also be used in switching installations as a dropout fuse in series with switching device.

BRIEF DESCRIPTION OF THE DRAWINGS

The invention is explained in more detail below on the basis of figures which merely represent exemplary embodiments and in which FIG. 3a shows a detail corresponding to FIG. 2 from an axial longitudinal section through a fuse according to the invention in a third embodiment, FIG. 3b shows an enlarged section through a component part of the fuse in the third embodiment, FIG. 4a shows a partial axial longitudinal section through a fuse according to the invention in a fourth embodiment and FIG. 4b shows a cross section through the fuse in the fourth embodiment along the plane B—B in FIG. 4a.

DETAILED DESCRIPTION OF THE INVENTION

Figure 1:
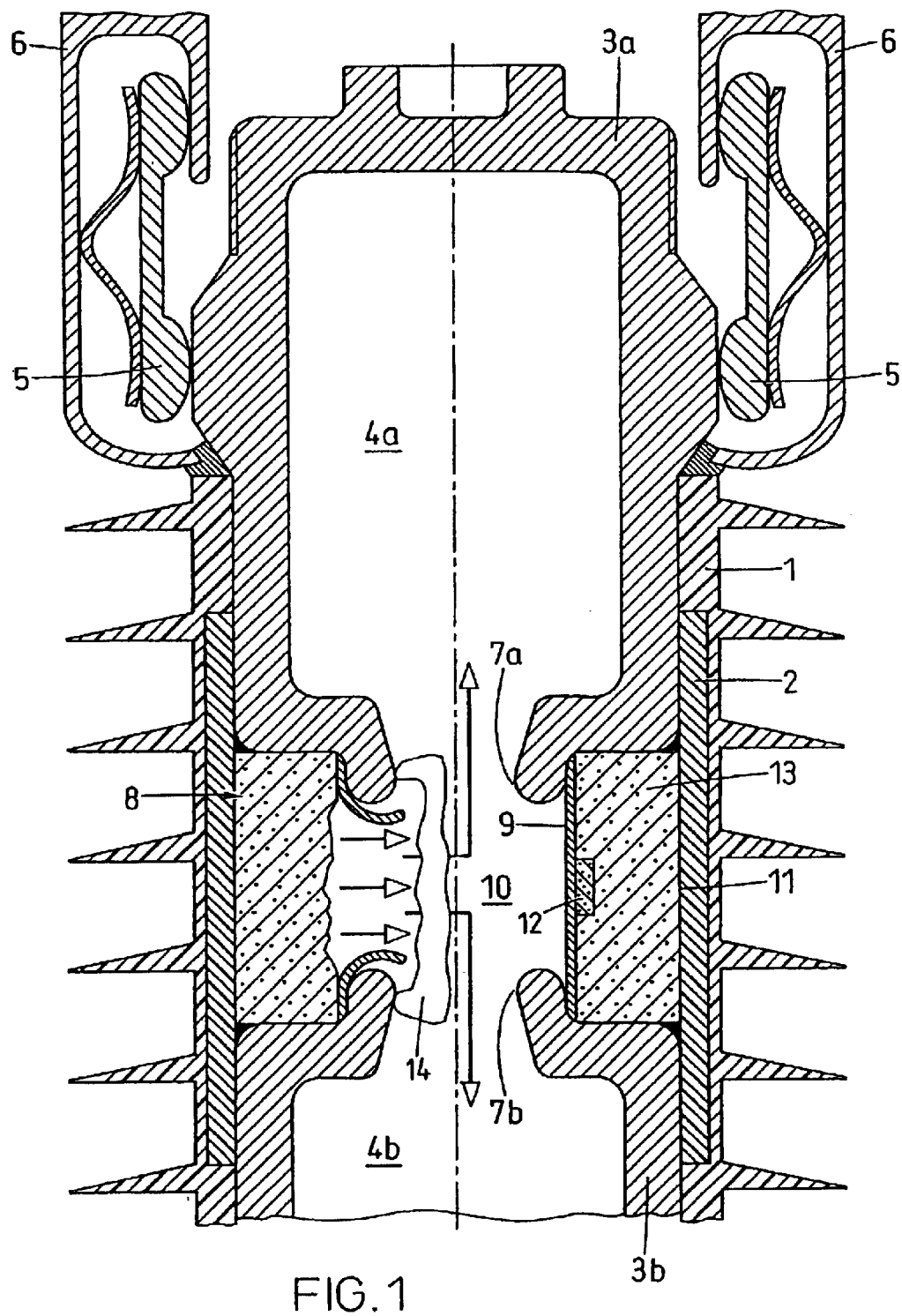
FIG. 1 shows a partial axial longitudinal section through a fuse according to the invention in a first embodiment.

In its basic construction, the fuse, which is substantially mirror-symmetrical about a center plane, has a cylindrical housing 1 (FIG. 1), which consists for example of plastic, with a central reinforcing ring 2 of fiber-reinforced plastic. Two vessels 3a,b of electrically conducting material, which surround exhaust volumes 4a,b, which may be evacuated or partly evacuated, and the end portions of which protrude from the housing 1 and are in electrically conducting contact with a connecting line 6 via contact fingers 5, lie opposite one another at a distance. They form mutually facing nozzles 7a,b, which connect the exhaust volumes 4a,b respectively to a fuse chamber 8 lying between them, which is bounded on the outside by the reinforcing ring 2. A fuse element 9 of foil or metal sheet, arranged in the fuse chamber 8 and designed in the form of a cylinder casing, the ends of which bear against the outer sides of the nozzles 7a,b so that they connect the same in an electrically conducting manner, bears against a central arc chamber 10. Adjoining the outer side of the fuse element 9 as a quenching gas source is a burn-off element 11, which concentrically surrounds the arc chamber 10 and the fuse element 9 and fills the part of the fuse chamber 8 lying between the latter and the reinforcing ring 2. It consists of igniting material 12, which forms a ring running around centrally and bearing against the fuseelement 9, and otherwise of a gas-evolving material 13.

The fuse element 9 is formed as a fusing conductor and consists entirely or predominantly of a fusible electrically conductive material, preferably a metal or an alloy with high conductivity and a relatively low melting point, for example silver. The igniting material 12 and the gas-evolving material 13 substantially consist, for example, in each case of a combustible material, which preferably contains predominantly organic nitrogen compounds, in particular guanidine or guanidine derivatives, optionally also an additive such as Mg, Al, Zr, Hf or Th and also an oxidant, which preferably substantially comprises nitrates, chlorates, perchlorates or permanganates.

In the case of the igniting material 12, the proportion accounted for by the oxidant is stoichiometric or hyperstoichiometric. It may also contain sodium acetateand a phase which undergoes a thermitic reaction. What is important is that it ignites at a temperature which can be easily set and, by evolving heat and gas, tears open the fuse element 9 and ignites the gas-evolving material 13. In the case of the latter, the proportion accounted for by the oxidant is preferably hypostoichiometric or at most stoichiometric, at least in such a way that it does not spontaneously ignite, but instead its burn-off is only triggered by the ignition of the igniting material 12. The gas-evolving material 13 may be a powder or else a pressed compact or sintered body. During the burn-off, it releases a large amount of quenching gas, in particular nitrogen or $CO_2$.

When an overcurrent occurs, the fuse element 9 heats up, until it reaches the igniting temperature of the igniting material 12 and triggers the ignition of the latter. The burn-off of the igniting material brings about a considerable evolvement of heat and gas, which leads to central tearing-open of the fuse element 9, already softened by the heating-off effect, and to the formation of an arc 14 in the arc chamber 10, and also to the ignition of the gas-evolving material 13, which then burns off with increased release of gas. The rapid release of a large amount of gas has the effect in the fuse chamber 8 of building up a high pressure, which produces a strong gas flow through the nozzles 7a,b into the exhaust volumes 4a,b. As a result, the parts of the fuse element 9 on both sides are bent back against the nozzles 7a,b and the arc 14 is subjected to intensive axial blowing, its base points on both sides being driven onto the still cold material of the nozzles 7a,b. The strong blowing leads to quenching of the arc 14 at the next zero crossing.

Figure 2:
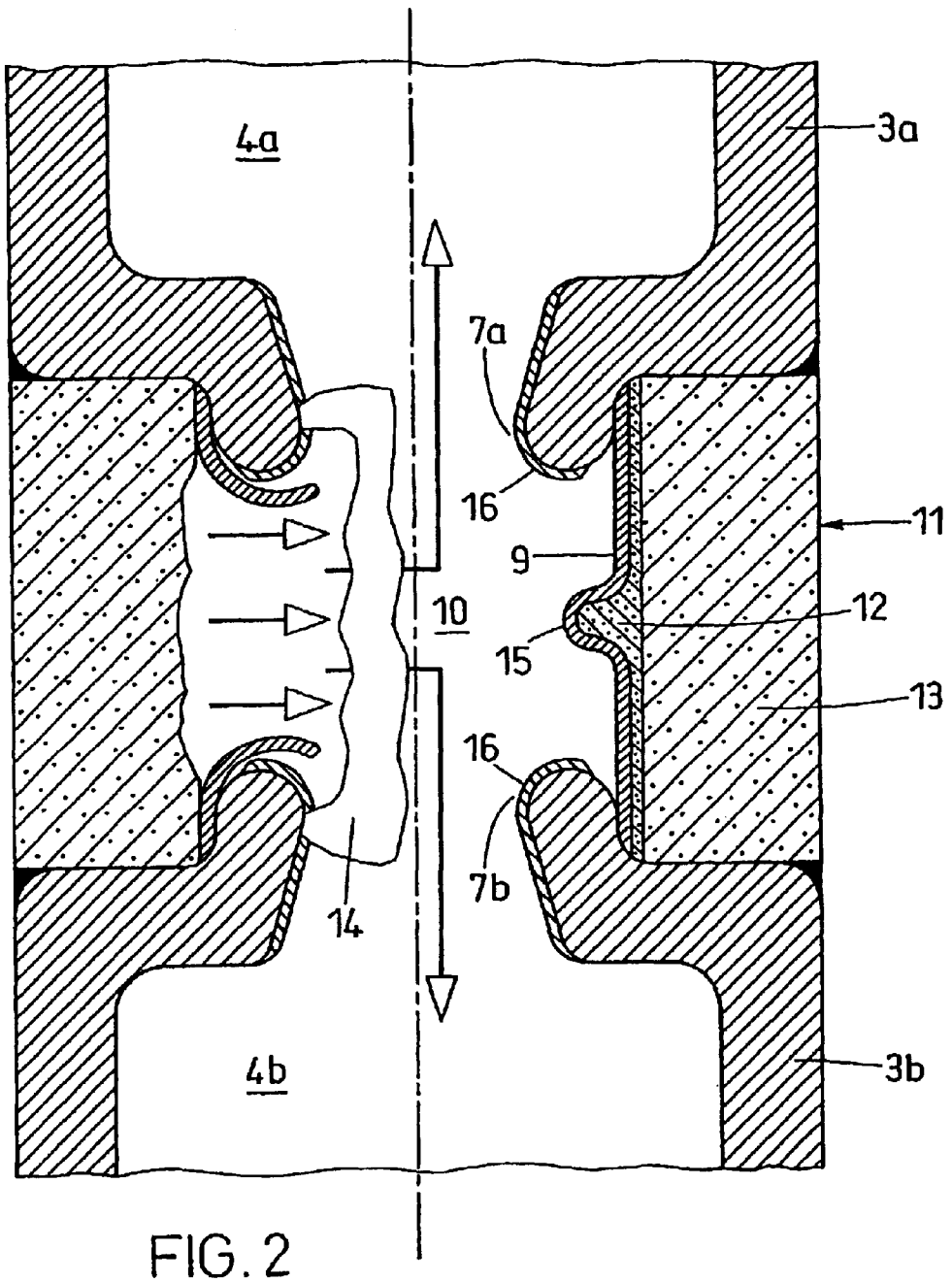
FIG. 2 shows a detail from an axial longitudinal section corresponding to FIG. 1 through a fuse according to the invention in a second embodiment.

According to a second embodiment (FIG. 2), the fuse element 9, which otherwise corresponds to that of the first embodiment, has a central, radially inwardly protruding peripheral indentation 15. The igniting material 12 adjoins the entire outer surface area of the fuse element 9 and consequently forms a continuous layer which covers the entire inner side of the gas-evolving material 13. The indentation 15 forms a triggering zone, at which the fuse element 9 is thermally and mechanically weaker, and consequently more easily interruptible, in particular more easily meltable, than in the remaining region. The nozzles 7a,b are covered with a polymer layer 16, for example of a polytetrafluoroethylene, polyolefin or polyethylene.

An overcurrent leads in particular to heating up of the triggering zone, so that the igniting temperature of the igniting material 12 is reached there first, and consequently the ignition is triggered and the fuse element 9 is torn open. The distribution of the igniting material 12 leads to a rapid ignition also of the gas-evolving material 13 over a broad front. The displacement of the arc base points onto the nozzles 7a,b soon after the formation of the arc 14 brings about an at least partial burn-off of the polymer layer 16, which assists the arc quenching.

A more easily meltable triggering zone can also be produced by other measures, or be assisted by them. For example, a zone of the surface of the fuse element 9 facing the arc chamber 10 may be covered with a heat-insulating layer, for example acrylic paint. Or the melting point of the material of the fuse element 9 may be reduced there, for example it may entirely or partially consist in the triggering zone of an $Ag_2In/AgIn_2$ alloy, the melting point of which lies between 230° C. and 260° C., while in the remaining region it consists for instance of pure (99.99%) silver with a melting point of 962° C.

According to a third embodiment (FIGS. 3a,b), the fuse element 9 is of a three-part construction, with two mirror-symmetrically arranged part-elements 17a,b, the radius of which decreases by an ever greater amount toward the center, so that there they form two radially inwardly protruding peripheral flanges which are spaced apart from one another. They are connected by an annularly peripheral clasp 18 of approximately U-shaped cross section, which receives the two flanges and holds them together. The region between the flanges and the clasp 18, which in turn forms a triggering zone at which the fuse element 9 is more easily interruptible, is filled with igniting material 12, which entirely covers the outer sides of the part-elements 17a,b in thinner layers and which is in turn adjoined on the outside by the gas-evolving material 13. The clasp 18 is composed (FIG. 3b) of an inner conductive layer 19, which consists of a highly conductive material such as silver or copper, and an outer shaped layer 20, which consists of a shape memory alloy.

When an overcurrent occurs, the fuse element 9 in turn heats up and the clasp 18 reaches a temperature at which it opens under the influence of the memory alloy. At approximately the same temperature, the igniting material 12 also ignites. The fuse element 9 can then be torn open very easily, since the mechanical cohesion has already been weakened by the effect of the memory alloy. A pretensioning of the part-elements 17a,b against the nozzles 7a,b can assist the process.

Figure 4A:
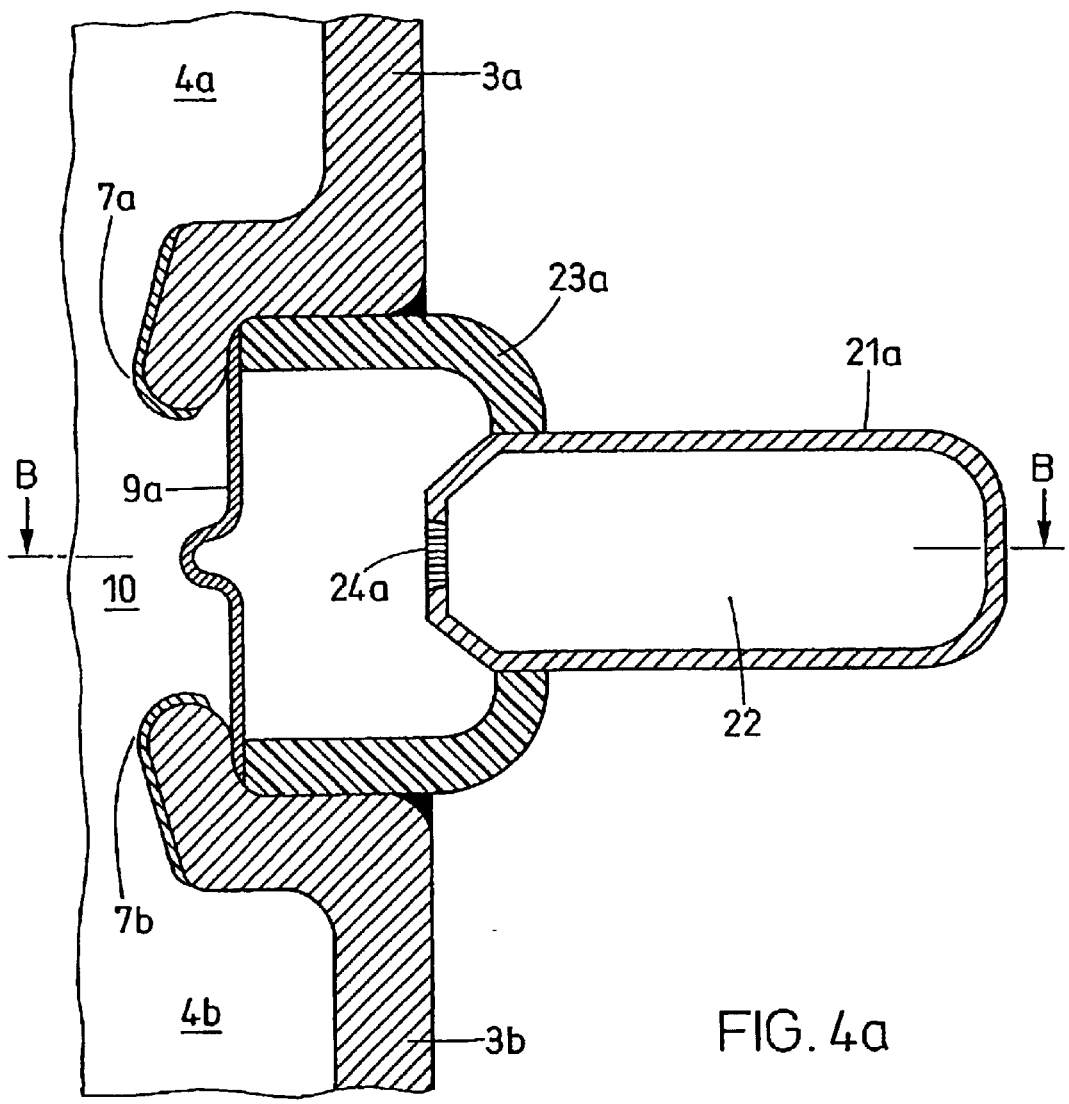
Figure 4B:
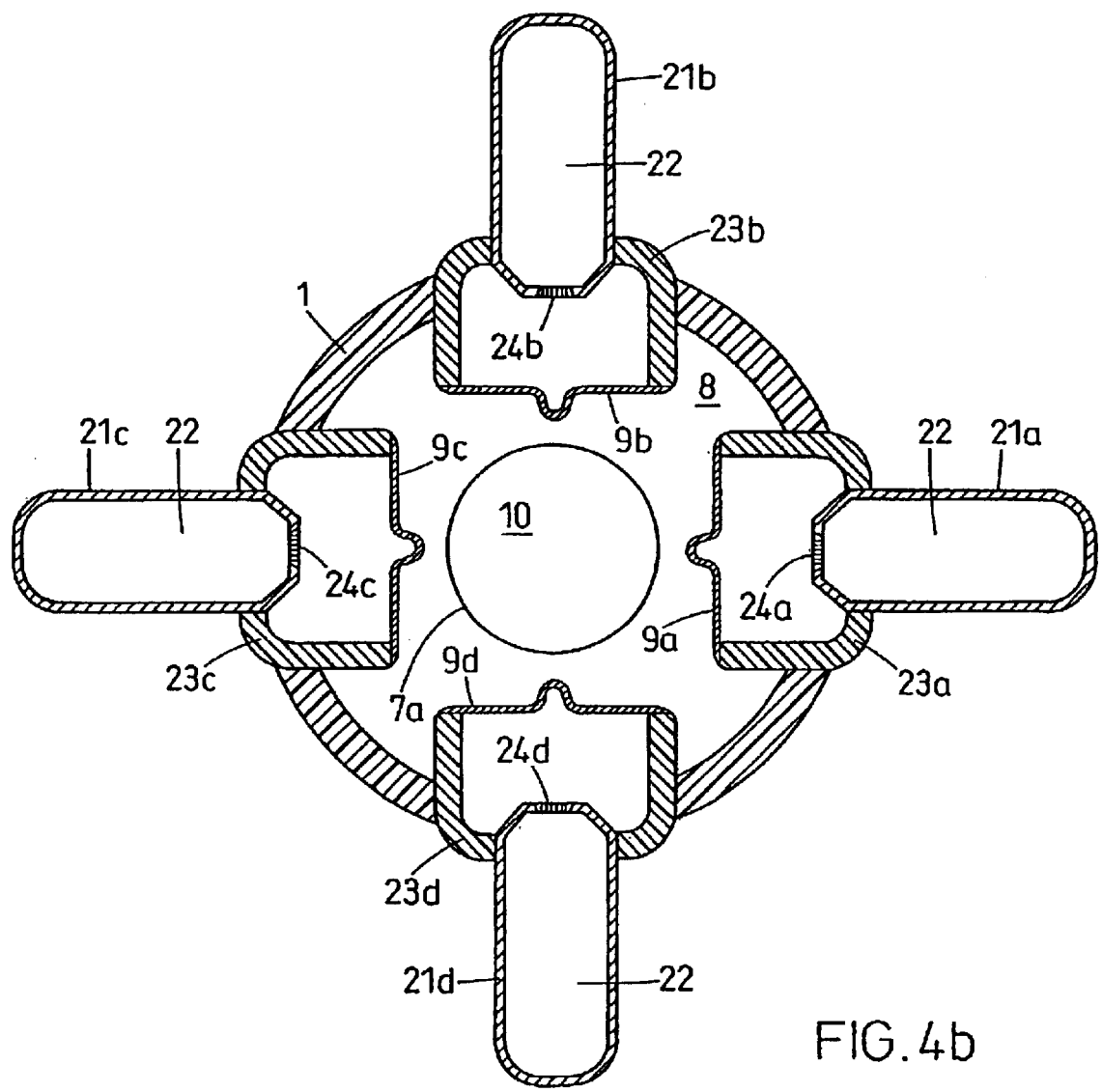
Figure 5:
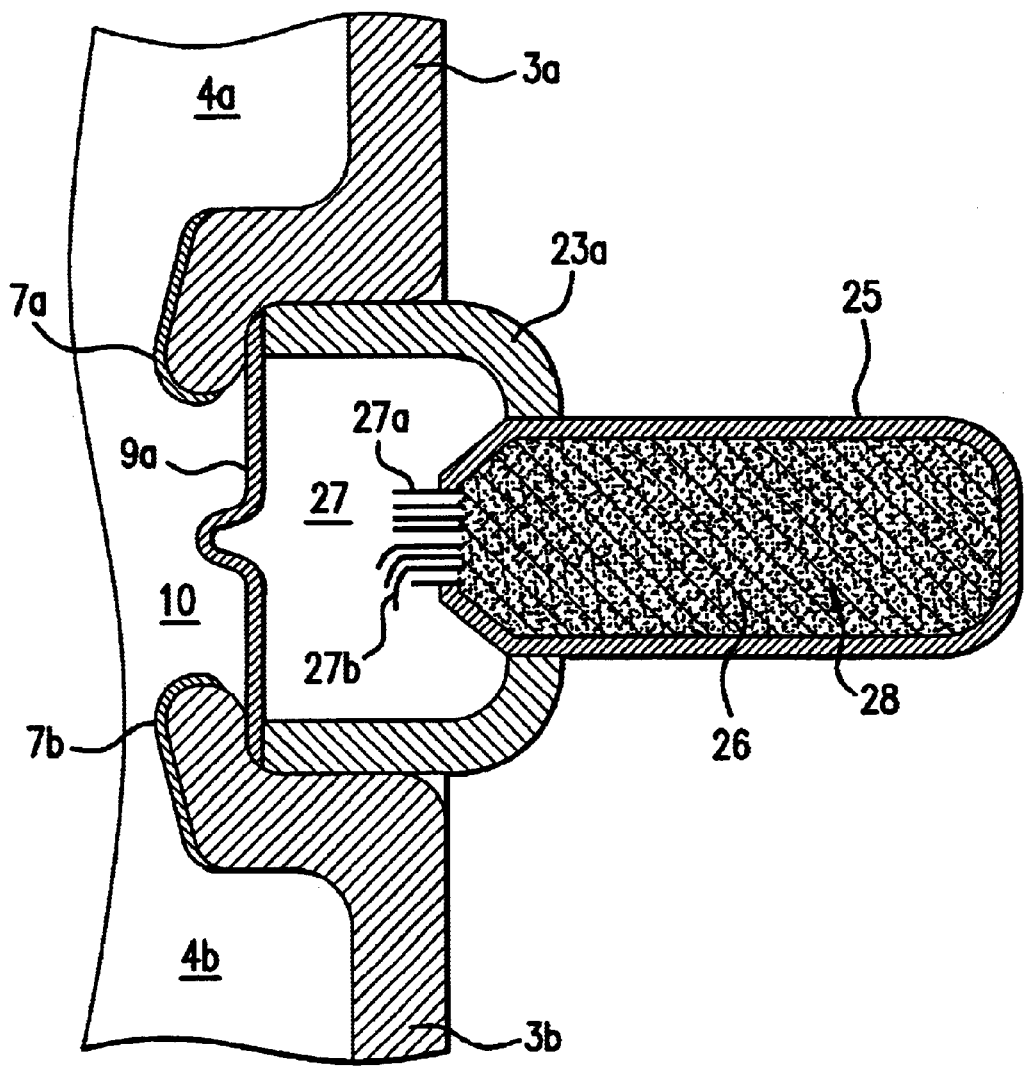
FIG. 5 shows a partial axial longitudinal section through a fuse according to the invention in a fifth embodiment.

In the case of a fourth embodiment (FIGS. 4a,b), the quenching gas source is formed by four part-sources which are uniformly grouped around the fuse chamber 8 and are formed in the example as approximately cylindrical compressed-gas tanks 21a–d, which are filled with a highly pressurized quenching gas 22, for example $N_2$. Each of the compressed-gas tanks 21a–d is fitted in an opening in the outer wall of one of four key-shaped holders 23a–d of insulating material, which for their part are respectively fitted in an opening of the housing 1 and are in contact with the two exhaust volumes 4a,b. The holder 23a forms a cavity, into which the compressed-gas tank 21a opens on the outer side via a valve 24a and which is closed on the inner side with respect to the arc cavity 10 by a fuse element 9a, which has a central bulge protruding into said arc cavity. The other compressed-gas tanks 21b–d are designed and fitted in an entirely corresponding way.

When an overcurrent occurs, the four parallel fuse elements 9a–d heat up and soften as a result. At the same time, the valves 24a–d are opened by external triggering, which may be controlled for example by an ammeter or voltmeter, and, as a result, a stream of compressed gas is passed from the compressed-gas tanks 21a–d through the holders 25a–d into the arc chamber 10 and further through the nozzles 7a,b into the exhaust volumes 4a,b, the part-elements 9a–d being separated and the arc which forms being quenched.

Instead of the compressed-gas tanks, cold-gas generators 25 may also be used, these largely being of the same design but filled with combustible material 26 while external coolers 27, for example grilles 27a, or deflecting systems 27b, are provided instead of valves. The combustible material 26 may substantially comprise organic nitrogen compounds such as guanidines or else acetates, and optionally an internal cooler 28, which preferably contains at least one metal oxide, in particular iron oxide or BaO, $MnO_2$, $Co_2O_3$+C or else LiF, KCl, C. However, other compositions of combustible material also come into consideration, such as those used for instance in the case of airbags in automobile construction, for example $21NaN_3+KNO_3+4Fe_2O_3+2.5SiO_2$, during the burning-off of which $N_2$ is produced in particular. The cold-gas generator 25 may, however, also be constructed in the way described in RU-A-2 108 282.

The triggering in turn takes place from the outside by an electric igniting pulse. When it flows through the external cooler 27, the gas produced during the burning-off of the combustible material 26 is greatly cooled, so that a very strong cooling effect develops in the arc chamber.

Numerous modifications of the embodiments described are possible without departing from the idea of the invention. For instance, the fuse chamber may also have a single nozzle and only one exhaust volume. The fuse also need not be rotationally symmetrical. What is important here is that the arc which forms when the fuse element melts through lies in the region of the gas flow which, emanating from the quenching gas source, forces its way through the nozzle or nozzles. If appropriate, it is possible, for example with regard to controlling the timing of the pressure build-up, for the burn-off element to have various forms and also to be interrupted by cavities or—in particular if triggering from outside is provided—also to be of a multi-part form.

| List of designations | |
|---|---|
| 1 | housing |
| 2 | reinforcing ring |
| 3a,b | vessels |
| 4a,b | exhaust volumes |
| 5 | contact fingers |
| 6 | conductors |
| 7a,b | nozzles |
| 8 | fuse chamber |
| 9 | fuse element |
| 10 | arc chamber |
| 11 | burn-off element |
| 12 | igniting material |
| 13 | gas-evolving material |
| 14 | arc |
| 15 | indentation |
| 16 | polymer layer |
| 17a,b | part-elements |
| 18 | clasp |
| 19 | conducting layer |
| 20 | shaped layer |
| 21a-d | compressed-gas tanks |
| 22 | quenching gas |
| 23a-d | holders |
| 24a-d | valves |
| 25 | cold-gas generator |
| 26 | combustible material |
| 27 | external cooler |
| 27a | grille |
| 27b | deflecting system |

What is claimed is:

1. A fuse with a fuse chamber and, at opposite ends of the same, a first electrical terminal and a second electrical terminal and also with at least one fuse element of electrically conducting meltable material, connecting the first electrical terminal to the second electrical terminal through the fuse chamber, and also with a triggerable quenching gas source for producing a quenching gas flow in the fuse chamber, wherein the fuse chamber has, at least one end, a nozzle, which connects the same to an exhaust volume, and in that at least one fuse element is arranged substantially between the quenching gas source and the nozzle, wherein the at least one fuse element has a triggering zone, in which it is more easily interruptible than in the remaining region, and wherein the triggering zone comprises a clasp, which connects two part-elements of the at least one fuse element.

2. The fuse as claimed in claim 1, wherein the at least one fuse element is arranged between the quenching gas source and an arc chamber, which is bounded by the at least one nozzle.

3. The fuse as claimed in claim 2, wherein the quenching gas source comprises a number of part-sources, which are arranged around the fuse element.

4. The fuse as claimed in claim 1, wherein the quenching gas source comprises at least one ignitable burn-off element.

5. The fuse as claimed in claim 4, wherein the at least one burn-off element is arranged in the fuse chamber and surrounds the at least one fuse element.

6. The fuse as claimed in claim 5, wherein the at least one fuse element and the at least one burn-off element concentrically surround the arc chamber.

7. The fuse as claimed in claim 1, wherein at least the surface of the at least one nozzle substantially consists of electrically conducting material and is connected in an electrically conducting manner to one of the electrical terminals.

8. The fuse as claimed in claim 1, wherein it has two nozzles arranged at mutually opposite ends of the fuse chamber.

9. The fuse as claimed in claim 1, wherein the at least one fuse element is formed as a foil or metal sheet and separates the quenching gas source from the arc chamber.

10. The fuse as claimed in claim 1, wherein the at least one fuse element is more easily meltable in the triggering zone.

11. The fuse as claimed in claim 6, wherein the triggering zone is formed by a radially inwardly protruding indentation.

12. The fuse as claimed in claim 10, wherein the material of the at least one fuse element has a lower melting point in the region of the triggering zone.

13. The fuse as claimed in claim 1, wherein the clasp comprises a shape memory alloy in such a way that it opens when a specific temperature is reached.

14. The fuse as claimed in claim 4, wherein the burn-off element bears against the at least one fuse element.

15. The fuse as claimed in claim 4, wherein the burn-off element consists of at least two different materials, an igniting material and a gas-evolving material.

16. The fuse as claimed in claim 14, wherein the part of the burn-off element bearing against the at least one fuse element consists at least partly, preferably entirely, of igniting material.

17. The fuse as claimed in claim 15, wherein the triggering material is substantially composed of a combustible material, which preferably substantially contains organic nitrogen compounds, in particular guanidine or guanidine derivatives, and also an oxidant, which preferably substantially contains nitrates, chlorates, perchlorates or permanganates, the proportion accounted for by the oxidant being stoichiometric or hyperstoichiometric.

18. The fuse as claimed in claim 15, wherein the gas-evolving material is composed of a combustible material, which preferably contains substantially organic nitrogen compounds, in particular guanidine or guanidine derivatives, and optionally also an additive such as Mg, Al, Zr, Hf or Th and also an oxidant, which preferably substantially contains nitrates, chiorates, perchlorates or permanganates, the proportion accounted for by the oxidant being stoichiometric or hypostoichiometric.

19. The fuse as claimed in claim 1, wherein the quenching gas source comprises at least one compressed-gas tank connected to the fuse chamber via a valve.

20. The fuse as claimed in claim 1, wherein the quenching gas source comprises at least one cold-gas generator connected to the fuse chamber.

21. The fuse as claimed in claim 20, wherein the at least one cold-gas generator comprises a combustible material, which preferably contains substantially organic nitrogen compounds such as guanidines or else acetates, and optionally an internal cooler, which preferably contains at least one metal oxide, in particular iron oxide or BaO, $MnO_2$, $Co_2O_3$+C or else LiF, KCl, C.

22. The fuse as claimed in claim 20, wherein the at least one cold-gas generator comprises an external cooler, which preferably contains at least one grille or deflecting system, facing the fuse chamber.

23. A fuse with a fuse chamber and, at opposite ends of the same, a first electrical terminal and a second electrical terminal and also with at least one fuse element of electrically conducting meltable material, connecting the first electrical terminal to the second electrical terminal through the fuse chamber, and also with a triggerable quenching gas source for producing a quenching gas flow in the fuse chamber, wherein the fuse chamber has, at at least one end, a nozzle, which connects the same to an exhaust volume, and in that at least one fuse element is arranged substantially between the quenching gas source and the nozzle, wherein the quenching gas source comprises at least one compressed-gas tank connected to the fuse chamber via a valve.

24. A fuse with a fuse chamber and, at opposite ends of the same, a first electrical terminal and a second electrical terminal and also with at least one fuse element of electrically conducting meltable material, connecting the first electrical terminal to the second electrical terminal through the fuse chamber, and also with a triggerable quenching gas source for producing a quenching gas flow in the fuse chamber, wherein the fuse chamber has, at at least one end, a nozzle, which connects the same to an exhaust volume, and in that at least one fuse element is arranged substantially between the quenching gas source and the nozzle, wherein the quenching gas source comprises at least one cold-gas generator connected to the fuse chamber, and wherein the at least one cold-gas generator comprises a combustible material, which preferably contains substantially organic nitrogen compounds such as guanidines or else acetates, and optionally an internal cooler, which preferably contains at least one metal oxide, in particular iron oxide or BaO, $MnO_2$, $Co_2O_3+C$ or else LiP, KCl, C.

25. A fuse with a fuse chamber and, at opposite ends of the same, a first electrical terminal and a second electrical terminal and also with at least one fuse element of electrically conducting meltable material, connecting the first electrical terminal to the second electrical terminal through the fuse chamber, and also with a triggerable quenching gas source for producing a quenching gas flow in the fuse chamber, wherein the fuse chamber has, at at least one end, a nozzle, which connects the same to an exhaust volume, and in that at least one fuse element is arranged substantially between the quenching gas source and the nozzle, wherein the quenching gas source comprises at least one cold-gas generator connected to the fuse chamber, and wherein the at least one cold-gas generator comprises an external cooler, which preferably contains at least one grille or deflecting system, facing the fuse chamber.

* * * * *